US012631252B2

(12) United States Patent
Woodward

(10) Patent No.: US 12,631,252 B2
(45) Date of Patent: May 19, 2026

(54) PISTON ASSEMBLY AND ASSOCIATED COMPONENTS, SYSTEMS, AND METHOD

(71) Applicant: Transcend Energy Group, LLC, Sandpoint, ID (US)

(72) Inventor: Jon Woodward, Mapleton, UT (US)

(73) Assignee: Transcend Energy Group, LLC, Sandpoint, ID (US)

( * ) Notice: Subject to any disclaimer, the term of this patent is extended or adjusted under 35 U.S.C. 154(b) by 0 days.

(21) Appl. No.: 18/351,176

(22) Filed: Jul. 12, 2023

(65) Prior Publication Data

US 2024/0052927 A1 Feb. 15, 2024

Related U.S. Application Data

(60) Provisional application No. 63/368,183, filed on Jul. 12, 2022.

(51) Int. Cl.
F16J 1/14 (2006.01)
F16J 1/00 (2006.01)

(52) U.S. Cl.
CPC F16J 1/005 (2013.01); F16J 1/14 (2013.01)

(58) Field of Classification Search
CPC ....... F02F 3/00; F02B 75/04; F16J 1/16; F16J 1/005; F16J 1/14
See application file for complete search history.

(56) References Cited

U.S. PATENT DOCUMENTS

| | | | |
|---|---|---|---|
| 1,379,115 A | 5/1921 | Mallory | |
| 1,430,491 A | 9/1922 | Joseph et al. | |
| 1,569,582 A | 1/1926 | Scott | |
| 2,369,792 A | 2/1945 | Notturno | |
| 4,089,235 A | 5/1978 | McWhorter | |
| 4,203,406 A | 5/1980 | Smith | |
| 4,567,866 A | 2/1986 | Schubert | |
| 5,479,894 A | 1/1996 | Noltemeyer et al. | |
| 6,789,313 B2 | 9/2004 | Hendricks | |
| 8,220,434 B2 | 7/2012 | Mouradov | |
| 8,286,606 B2 | 10/2012 | Breidenbach et al. | |
| 8,601,994 B2 | 12/2013 | Mukouhara et al. | |
| 9,334,797 B2 | 5/2016 | Velazquez | |
| 10,151,269 B2 | 12/2018 | Brown et al. | |
| 10,578,149 B2 | 3/2020 | Fukuma et al. | |
| 11,125,269 B1 | 9/2021 | Velazquez | |
| 2010/0065009 A1 | 3/2010 | Mukouhara et al. | |
| 2010/0282206 A1 | 11/2010 | Mouradov | |
| 2021/0180541 A1* | 6/2021 | Woodward ................. | F16J 1/18 |

FOREIGN PATENT DOCUMENTS

| | | |
|---|---|---|
| BR | I9500241 A | 10/1995 |
| CN | 201310408 | 9/2009 |
| EP | 1165976 B1 | 1/2002 |
| JP | 2003-194172 A | 7/2003 |
| JP | 2005-106085 A | 4/2005 |

(Continued)

*Primary Examiner* — Nathaniel E Wiehe
*Assistant Examiner* — Daniel S Collins
(74) *Attorney, Agent, or Firm* — TraskBritt

(57) ABSTRACT

A piston assembly includes a piston head. The piston assembly further includes an upper connecting rod rotatably coupled to the piston head. The piston assembly also includes a shoe positioned between the upper connecting rod and an inner wall of the piston head.

18 Claims, 6 Drawing Sheets

(56)                    References Cited

FOREIGN PATENT DOCUMENTS

| JP | 2009-041523 A | 2/2009 |
| JP | 2010-071122 | 5/2011 |
| JP | 2012-505350 | 3/2012 |
| JP | 5008627 | 8/2012 |
| JP | 5388249 | 1/2014 |
| JP | 2015-218731 A | 12/2015 |
| JP | 2016-211680 | 12/2016 |
| KR | 10-2002-0054385 A | 7/2002 |
| KR | 10-0412555 B1 | 7/2002 |
| WO | 01/55606 A1 | 8/2001 |
| WO | 2017/013727 A1 | 1/2017 |

* cited by examiner

PISTON ASSEMBLY AND ASSOCIATED COMPONENTS, SYSTEMS, AND METHOD

CROSS-REFERENCE TO RELATED APPLICATION

This application claims the benefit under 35 U.S.C. § 119(e) of U.S. Provisional Patent Application Ser. No. 63/368,183, filed Jul. 12, 2022, the disclosure of which is hereby incorporated herein in its entirety by this reference.

TECHNICAL FIELD

The present disclosure relates to an internal combustion engine and, more specifically, to a piston assembly for use in an engine and for connecting a piston head to a crankshaft of the engine.

BACKGROUND

A conventional internal combustion engine of the type found in most vehicles today includes a plurality of pistons that are, respectively, movably mounted in a plurality of cylinders formed in an engine block. Each of the pistons is connected to a piston rod at a first end of the piston rod, and the piston rod is coupled to a crankshaft at a second end of the piston rod. Furthermore, when spark plugs within the engine block fire to ignite a fuel mixture, the pistons are driven downward to turn the crankshaft, which ultimately drives the entire vehicle. In a typical engine, a single connecting rod is used and connected with a respective first end to the corresponding piston and a respective second end to a corresponding portion of the crankshaft. The connecting points between the two ends of each connecting rod and the corresponding piston and corresponding crankshaft are disposed at the ends of the longitudinal center axis of the respective connecting rod.

SUMMARY

Embodiments of the disclosure include a piston assembly. The piston assembly includes a piston head. The piston assembly further includes an upper connecting rod rotatably coupled to the piston head. The piston assembly also includes a shoe positioned between the upper connecting rod and an inner wall of the piston head.

Another embodiment of the disclosure includes an engine. The engine includes a cylinder, a crankshaft, and a piston assembly disposed within the cylinder. The piston assembly includes a piston head. The piston assembly further includes an upper connecting rod rotatably coupled to the piston head. The piston assembly also includes a lower connecting rod coupled between the upper connecting rod and the crankshaft. The piston assembly further includes a shoe slidably coupled between the upper connecting rod and a skirt of the piston head.

Another embodiment of the disclosure includes an upper connecting rod of a piston assembly. The upper connecting rod includes a piston connection point. The upper connecting rod further includes a lower rod connection point. The upper connecting rod also includes a curved recess defined in an outer edge of the upper connecting rod. The curved recess is configured to receive an interfacing element between the upper connecting rod and a piston. The curved recess is positioned closer to the piston connection point than the lower rod connection point.

BRIEF DESCRIPTION OF THE SEVERAL VIEWS OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

Figure 1:
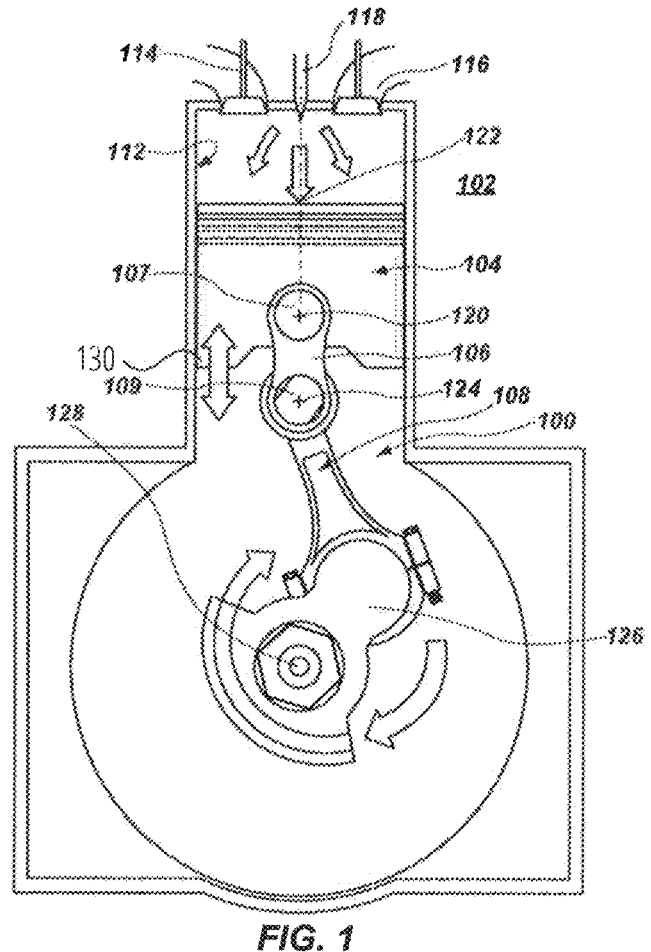
FIG. 1 is a schematic depiction of a piston assembly within an engine according to one or more embodiments of the present disclosure.

The illustrations presented herein are not actual views of any internal combustion engine system, piston assembly, or any component thereof, but are merely idealized representations, which are employed to describe embodiments of the present disclosure.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, any relational term, such as "first," "second," "top," "bottom," "upper," "lower," etc., is used for clarity and convenience in understanding the disclosure and accompanying drawings, and does not connote or depend on any specific preference or order, except where the context clearly indicates otherwise. For example, these terms may refer to orientations of elements of a piston assembly or an engine in conventional orientations. Furthermore, these terms may refer to orientations of elements of a piston assembly or an engine as illustrated in the drawings.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 shows a schematic representation of a piston assembly 100 disposed within an engine 102. The piston assembly 100 may include a piston head 104, an upper rod 106, a gudgeon pin assembly 107 (e.g., two or more pin locks, a needle sleeve bearing, and gudgeon pin (e.g., wrist pin)), a lower rod 108, and a connector pin assembly 109. The engine 102 may include a cylinder 112, one or more valves 114 and exhaust ports 116 (e.g., an intake valve and port and exhaust valve and port), and a fuel injector 118. The one or more valves 114 and exhaust ports 116 of the engine 102 may be oriented in conventional manners.

The piston head 104 of the piston assembly 100 may be disposed within the cylinder 112 of the engine 102 and may be configured to reciprocate back and forth (e.g., up and down as depicted in FIG. 1) during use. The upper rod 106 may be coupled to the piston head 104 via the gudgeon pin assembly 107 at a first longitudinal end of the upper rod 106 and may be coupled to the lower rod 108 at a second opposite longitudinal end of the upper rod 106. In some embodiments, the upper rod 106 may be coupled to the piston head 104 proximate or at a centroid of the piston head 104. In one or more embodiments, the upper rod 106 may be coupled to the piston head 104 at a point that is centered between an upper surface and lower surface of the piston head 104 and intersecting a center longitudinal axis 122 of the piston head 104. In one or more embodiments, a longitudinal axis 120 of the gudgeon pin assembly 107 may extend in a direction perpendicular to the longitudinal axis 122 of the piston head 104 and may intersect the longitudinal axis 122 of the piston head 104. The upper rod 106 may be configured to not rotate and/or translate relative to the piston head 104 during use.

The upper rod 106 may extend in an axial direction (e.g., in a direction parallel to the longitudinal axis 122 of the piston head 104) from the piston head 104 to a region below the piston head 104 (e.g., below the piston head 104 as depicted in FIG. 1). For instance, a longitudinal length of the upper rod 106 may be greater than a distance from a point at which the upper rod 106 is coupled to the piston head 104 to a lowermost surface of the piston head 104. Furthermore, the longitudinal axis of the upper rod 106 may be parallel to the longitudinal axis 122 of the piston head 104. In view of the foregoing, a lower longitudinal end of the upper rod 106 may be oriented beneath the piston head 104 when the upper rod 106 is coupled to the piston head 104.

As noted above, the upper rod 106 may be coupled to the lower rod 108 on a longitudinal end opposite the piston head 104 (i.e., the lower longitudinal end of the upper rod 106). In some embodiments, the upper rod 106 may be coupled to the lower rod 108 via the connector pin assembly 109. In one or more embodiments, the connector pin assembly 109 may include any gudgeon and/or wrist pin and associated assembly known in the art.

The lower rod 108 may be rotatable relative to the upper rod 106. For instance, the lower rod 108 may be configured to pivot about the connector pin assembly 109 and the upper rod 106. For example, the connector pin assembly 109 may provide a bearing about which the lower rod 108 may pivot as the piston assembly 100 cycles through strokes (described below).

The lower rod 108 may be coupled to a crankshaft 126 at a longitudinal end of the lower rod 108 opposite the upper rod 106. The crankshaft 126 may include a conventional crankshaft. For instance, the crankshaft 126 may translate reciprocating motion of the piston head 104 into rotational motion. As is known in the art, a crankshaft includes multiple "crank throws" or "crankpins" and multiple bearing surfaces (e.g., rod journals, connecting rod journals, etc.) having axes offset from the center longitudinal axis 128 of the crankshaft 126. The lower rod 108 may be coupled to a respective bearing surface of the crankshaft 126. Additionally, the lower rod 108 may be coupled to the crankshaft 126 via any conventional bearings. Furthermore, as will be appreciated by one of ordinary skill in the art, an axis of rotation 128 (i.e., center longitudinal axis) of the crankshaft 126 may be parallel to the longitudinal axis 124 of the connector pin assembly 109.

For purposes of describing the operation of the piston assembly 100, hour positions of a typical clock face are referred to herein (e.g., 12 o'clock, 3 o'clock, etc.) as positions of the lower longitudinal end of the lower rod 108 about the axis of rotation 128 of the crankshaft 126. For example, the foregoing positions may refer to a center point of the lower longitudinal end of the lower rod 108 and its position relative to the axis of rotation 128 of the crankshaft 126 as depicted in FIG. 1, wherein the piston head 104 associated with the lower rod 108 is at top dead center in the 12 o'clock position and at bottom dead center at the 6 o'clock position regardless of an orientation of the associated engine and/or cylinder.

In some embodiments, the engine 102 and piston assembly 100 may include a four-stroke engine. For instance, during use, the piston assembly 100 may complete four separate strokes while turning the crankshaft 126. In other words, the engine 102 and piston assembly 100 may cycle through a typical four-stroke cycle.

The piston assembly 100 may begin a four-stroke cycle with an intake stroke (e.g., an induction or suction stroke). The intake stroke begins with the piston head 104 positioned at top dead center and ends with the piston head 104 positioned at bottom dead center, as is known in the art. During the intake stroke, an intake valve (e.g., valve 114) opens (due to a distributor cam lobe of a distributor cam, as is known in the art), and as the piston head 104 moves downward within the cylinder 112, the piston head 104 pulls air mixture into the cylinder 112 by generating a vacuum pressure within the cylinder 112 via the piston head's 104 downward motion. Additionally, the fuel injector 118 injects fuel into the air to form an air-fuel mixture. As noted above, the piston assembly 100 of the present disclosure may reduce a force required to move the piston head 104 from the 12 o'clock position to the 6 o'clock position, and as a result, a portion of the energy required to perform the intake stroke may be saved (e.g., energy from other piston assemblies rotating the crankshaft 126 during power (i.e., combustion) strokes of the other piston assemblies). As will be appreciated by one of ordinary skill in the art, reducing an amount of energy required to perform intake strokes will result in more energy being available for other operations of the engine 102 (e.g., operating a vehicle with the engine 102). Accordingly, the piston assembly 100 of the present disclosure may provide a more efficient engine in comparison to conventional piston assemblies.

Subsequent to the intake stroke, the piston assembly 100 commences a compression stroke. The compression stroke begins with the piston head 104 positioned at bottom dead center and ends with the piston head 104 positioned at top dead center. During the compression stroke, the piston head 104 compresses the air-fuel mixture in preparation for ignition during the power stroke (described below). Furthermore, during the compression stroke, the intake and exhaust valves (e.g., valves 114) are closed. As described above, the piston assembly 100 of the present disclosure reduces a force required to move the piston head 104 from the 6 o'clock position to the 12 o'clock position, and as a result, a portion of the energy required during the compression stroke may be saved. As will be appreciated by one of ordinary skill in the art, reducing an amount of energy required to perform compression strokes will result in more energy being available for other operations of the engine 102.

Upon compressing the air-fuel mixture and arriving at top dead center, the piston assembly 100 may commence the power (i.e., combustion or ignition) stroke. When the piston head 104 is proximate to top dead center, the air-fuel mixture is ignited by an initiator (e.g., spark plug, glow plug, etc.) or heat generated by high compression (e.g., diesel engines). Igniting the air-fuel mixture causes an explosion that forcibly causes the piston head 104 to return to bottom dead center. As is known in the art, the power stroke produces mechanical work from the engine 102 to rotate the crankshaft 126. For instance, the power stroke may produce mechanical work via conventional methods involving piston assemblies and crankshafts.

As described above, the piston assembly 100 of the present disclosure reduces a force required to move the piston head 104 from the 6 o'clock position or from the 12 o'clock position. As a result, the piston assembly of the present disclosure enables the air-fuel mixture to be ignited closer to or at the 12 o'clock position in comparison to conventional piston assemblies. For instance, conventional piston assemblies typically have ignition positions between the 10 o'clock and 12 o'clock positions in order to provide the necessary force to rotate through the 12 o'clock position. Furthermore, as will be understood by one of ordinary skill in the art, having the air-fuel mixture be ignited closer to or at the 12 o'clock position (and not significantly earlier) may result in a greater amount of the pressure generated by ignition acting on the piston assembly to move the piston assembly down in the power stroke.

Upon reaching bottom dead center, the piston assembly 100 initiates an exhaust stroke. During the exhaust stroke, the piston head 104 of the piston assembly 100 once again returns from bottom dead center to top dead center while an exhaust valve (e.g., valve 114) is open. The action of the piston head 104 moving from bottom dead center to top dead center expels spent air-fuel mixture past the exhaust valve 114 and through an exhaust port 116. Furthermore, upon reaching top dead center, the piston assembly 100 may repeat the above-described four strokes.

During the different strokes, the forces transmitted through the upper rod 106 and lower rod 108 may introduce a longitudinal force in a direction along the center longitudinal axis 122 and a lateral force perpendicular to the center longitudinal axis 122. The longitudinal force may act to move the piston head 104 along the center longitudinal axis 122 in the cylinder 112. The lateral force may generate a moment on the piston head 104 due to the moment arm created by the upper rod 106. The piston head 104 may include a skirt 130 configured to substantially prevent the piston head 104 from tipping or rocking in the cylinder 112. However, the skirt 130 may contact the walls of the cylinder 112 and create additional friction. Thus, additional features configured to counteract the lateral forces and/or reduce the moment arm created by the upper rod 106 may reduce friction forces and increase an efficiency of the associated engine 102.

Figure 2:
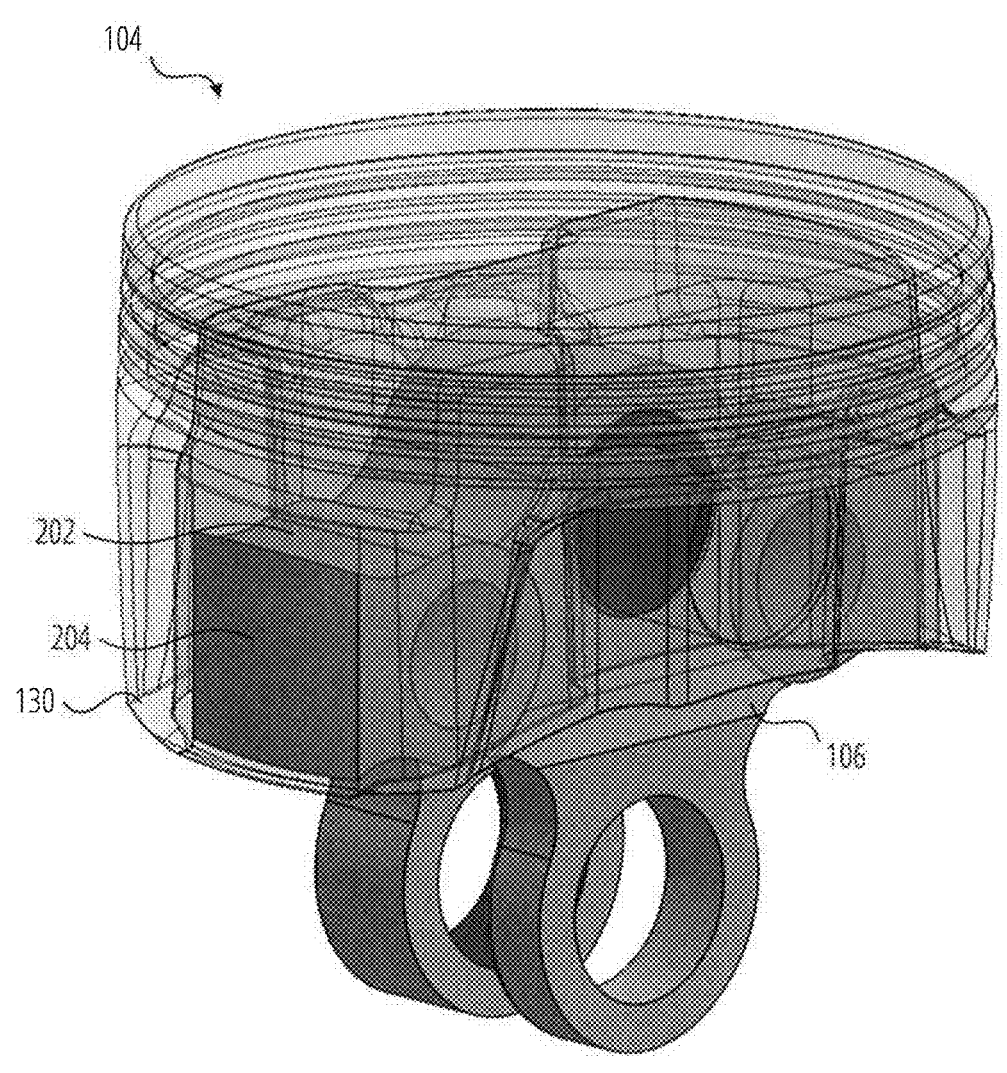
FIGS. 2-4 illustrate different views of a piston head assembly in accordance with one or more embodiments of the disclosure.
Figure 3:
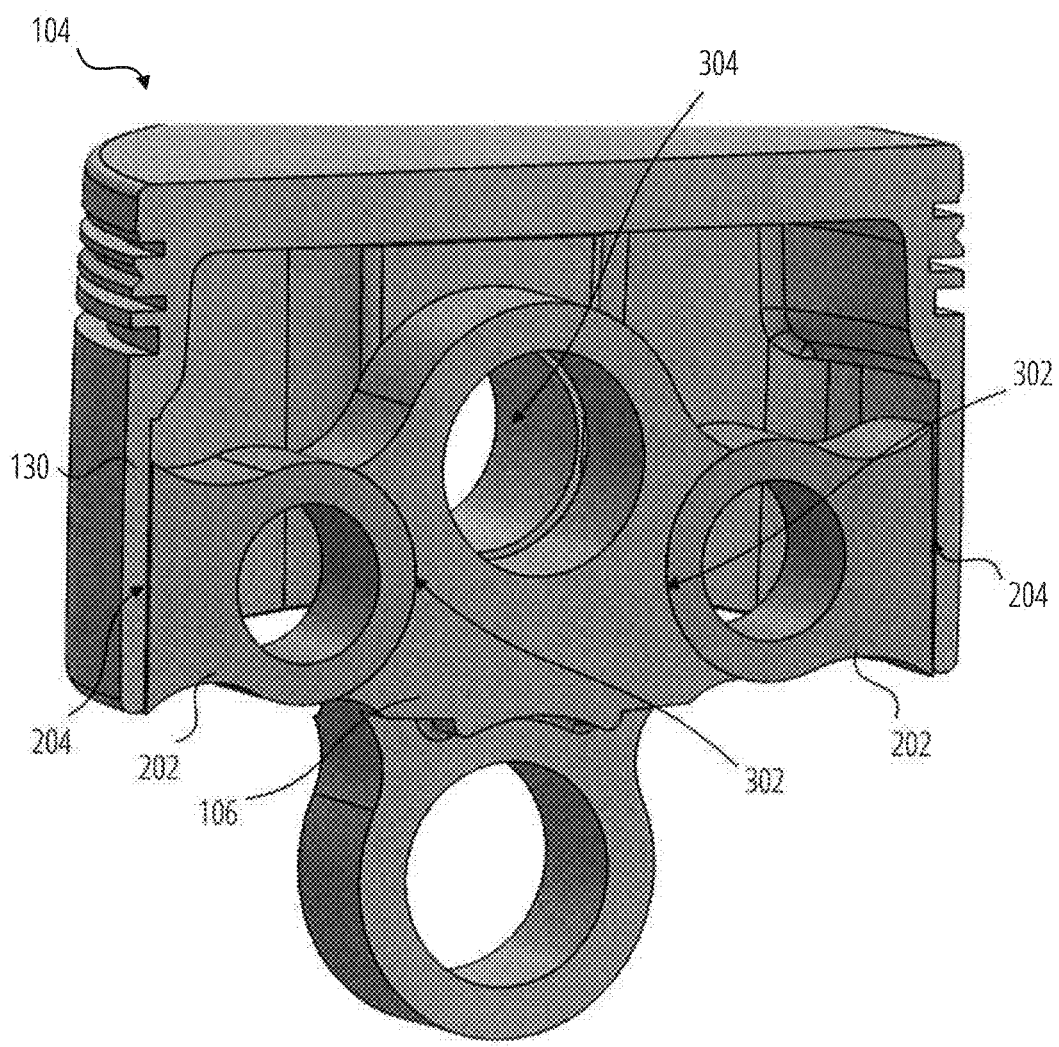
Figure 4:
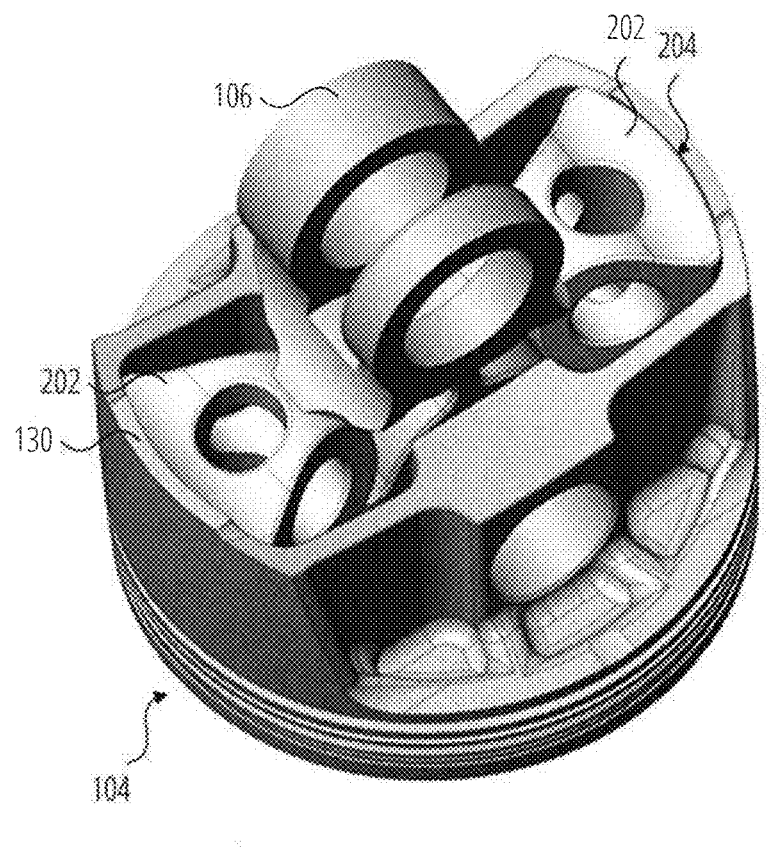

FIGS. 2-4 illustrate different views of a piston head 104 including shoes 202 coupled between the upper rod 106 and the skirts 130 of the piston head 104. The shoes 202 may be configured to change the moment arm of the upper rod 106 relative to the piston head 104 and may reduce the lateral forces transferred to the piston head 104 by the upper rod 106. For example, the shoes 202 may include a skirt interface 204 and a rod interface 302. Each of the skirt interface 204 and the rod interface 302 may be sliding connections, such that the shoes 202 may move relative to the skirt 130 and the upper rod 106. The sliding connections may facilitate the upper rod 106 rotating slightly relative to the piston head 104. For example, the rod interface 302 may form a fulcrum point about which the upper rod 106 may rotate in small increments. The lateral forces in the upper rod 106 may be transferred to the skirt 130 through the shoes 202. A second opposing force may be applied at a piston connection point 304 due to the fulcrum created by the rod interface 302 between the shoes 202 and the upper rod 106. The lateral forces in the shoes 202 and at the piston connection point 304 may each be applied to the piston head 104 at different positioned on a same side of the piston head 104 relative to an axis of rotation of the piston head 104. Thus, the opposing lateral forces may generate opposing moments on the piston head 104 and may substantially reduce the moment experienced by the piston head 104.

Figure 5:
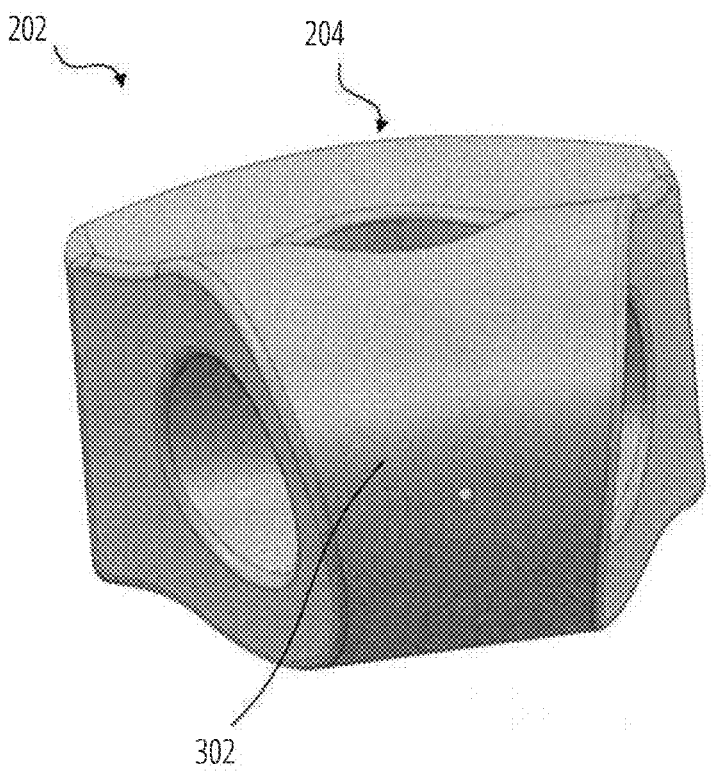
FIG. 5 illustrates a perspective view of a shoe of the piston head assembly of FIGS. 2-4 in accordance with one or more embodiments of the disclosure.

FIG. 5 illustrates an embodiment of the shoe 202. As illustrated, the skirt interface 204 may have a greater width than the rod interface 302. The greater width of the rod interface 302 may increase a surface area of the skirt interface 204 relative to the rod interface 302. The greater relative surface area of the skirt interface 204 may reduce a pressure generated by the lateral force, which may reduce a pressure generated on the skirt 130 (FIGS. 2-4) by the skirt interface 204. Reducing a pressure on the skirt 130 (FIGS. 2-4) may facilitate forming the skirt 130 from a thinner material, which may reduce a weight of the piston head 104.

The skirt interface 204 may have a radius that substantially matches a radius of an inner surface of the associated skirt 130 (FIGS. 2-4). The radius may facilitate a substantially uniform distribution of the lateral force on the associated skirt 130 (FIGS. 2-4) by the shoe 202. Distributing the force may reduce localized pressures on the inner surface of the skirt 130 (FIGS. 2-4) which may facilitate forming the skirt 130 from thinner materials similar to the increased surface area of the skirt interface 204.

Figure 6:
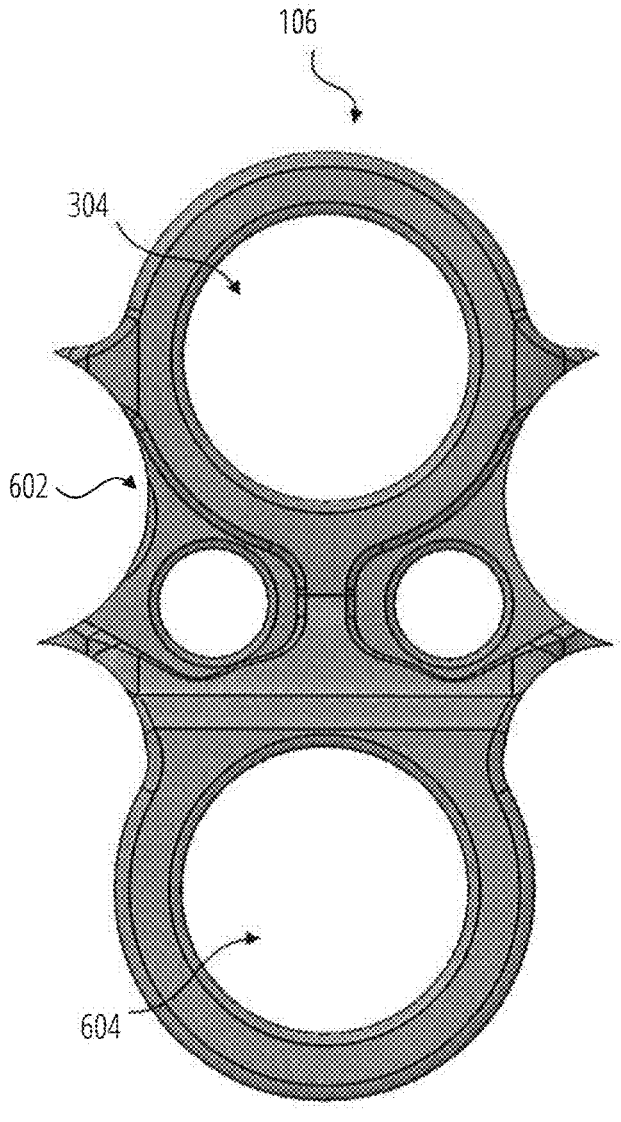
FIG. 6 illustrates a side view of an upper connecting rod of the piston head assembly of FIGS. 2-4 in accordance with one or more embodiments of the disclosure.

FIG. 6 illustrates a side view of an upper rod 106. The upper rod 106 includes a piston connection point 304 and a lower rod connection point 604. The upper rod 106 may also include recesses 602 configured to interface with the rod interfaces 302 of the associated shoes 202. The recesses 602 may have a curved surface complementary to the rod interface 302 of the associated shoes 202. The curved surface of the recesses 602 may define an arc having an angle greater than about 60 degrees, such as an angle greater than about 90 degrees, or an angle greater than about 100 degrees. In some embodiments, the recesses 602 may include a bearing material or insert configured to reduce friction between the rod interfaces 302 of the shoes 202 and the recesses 602. The recesses 602 may be positioned closer to the piston connection point 304 than the lower rod connection point 604. Positioning the recesses 602 proximate the piston connection point 304 may cause moments and forces in the components and areas proximate the recesses 602 and the piston connection point 304 to be similar, which may substantially prevent the piston head 104 (FIGS. 1-4) from tilting or rocking in the cylinder 112 (FIG. 1).

Embodiments of the disclosure may substantially prevent or reduce tilting or rocking of piston heads in a cylinder of an engine. Reducing or preventing tilting or rocking of the piston heads may substantially reduce contact and the associated friction between the piston head and the cylinder wall.

Reducing the contact between the piston head and the cylinder wall may increase efficiency of the engine and may reduce wear on the piston head and cylinder wall. The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A piston assembly comprising:
a piston head;
an upper connecting rod rotatably coupled to the piston head; and
a shoe positioned between the upper connecting rod and an inner wall of the piston head, the shoe having a convex piston interface surface in contact with the inner wall of the piston head and a convex rod interface surface in contact with the upper connecting rod, wherein a surface area of the convex piston interface surface is greater than a surface area of the convex rod interface surface.

2. The piston assembly of claim 1, wherein the convex piston interface surface is in sliding contact with the inner wall of the piston head.

3. The piston assembly of claim 1, wherein the inner wall of the piston head comprises an inner wall of a piston skirt.

4. The piston assembly of claim 3, wherein the shoe is configured to distribute a lateral force across the inner wall of the piston skirt.

5. The piston assembly of claim 1, wherein the convex rod interface surface is in sliding contact with the upper connecting rod.

6. The piston assembly of claim 5, wherein the upper connecting rod comprises a complementary recess in sliding contact with the convex rod interface surface of the shoe.

7. The piston assembly of claim 6, wherein the complementary recess comprises a curved surface.

8. The piston assembly of claim 1, wherein the shoe has a first width proximate the upper connecting rod and a second width proximate the inner wall of the piston head and wherein the second width is greater than the first width.

9. An engine comprising:
a cylinder;

a crankshaft; and
a piston assembly disposed within the cylinder, the piston assembly comprising:
a piston head;
an upper connecting rod rotatably coupled to the piston head;
a lower connecting rod coupled between the upper connecting rod and the crankshaft; and
a shoe slidably coupled between a recess in the upper connecting rod and a skirt of the piston head, where a rod interface surface of the shoe slidably connected to the recess is smaller than a skirt interface surface of the shoe slidably connected to the skirt;
wherein the upper connecting rod is configured to rotate in small increments relative to the shoe.

10. The engine of claim 9, wherein the shoe comprises a skirt interface surface slidably connected to the skirt of the piston head.

11. The engine of claim 10, wherein the skirt interface surface has a radius that substantially matches a radius of an inner surface of the skirt of the piston head.

12. The engine of claim 9, wherein the recess comprises a curved surface complementary to a rod interface surface of the shoe.

13. The engine of claim 9, wherein the recess further comprises a bearing insert.

14. The engine of claim 9, wherein the recess is positioned closer to a piston connection between the upper connecting rod and the piston head than a lower rod connection between the upper connecting rod and the lower connecting rod.

15. An upper connecting rod of a piston assembly, the upper connecting rod comprising:
a piston connection point;
a lower rod connection point; and
a curved recess defined in an outer edge of the upper connecting rod, the curved recess defining an arc having an angle greater than 60 degrees, the curved recess configured to receive an interfacing element between the upper connecting rod and a piston, the curved recess positioned between the piston connection point and the lower rod connection point and positioned closer to the piston connection point than the lower rod connection point.

16. The upper connecting rod of claim 15, wherein the piston connection point comprises a gudgeon pin assembly.

17. The upper connecting rod of claim 16, wherein the lower rod connection point comprises a connector pin assembly.

18. The upper connecting rod of claim 15, wherein the curved recess comprises an arc of at least 90 degrees.

* * * * *